US006152366A

United States Patent [19]

Maddox et al.

[11] Patent Number: 6,152,366

[45] Date of Patent: Nov. 28, 2000

[54] CASH DRAWER BILL DISPENSER

[75] Inventors: Craig E. Maddox; Daniel F. White, both of Lilburn, Ga.

[73] Assignee: NCR Corporation, Dayton, Ohio

[21] Appl. No.: 09/188,637

[22] Filed: Nov. 9, 1998

[51] Int. Cl.[7] ................................ G06F 7/08; G07G 1/00

[52] U.S. Cl. ............................ 235/381; 235/22; 206/565

[58] Field of Search ................................ 235/10, 7 R, 22, 235/381; 206/565, 562, 560, 449, 81

[56] References Cited

U.S. PATENT DOCUMENTS 3,892,309 7/1975 Coffey et al. ............................ 206/74
4,412,709 11/1983 Ishii ........................................ 312/291
4,436,989 3/1984 Schuldt .................................... 235/22
4,638,908 1/1987 Baitz et al. ............................. 206/0.8
5,451,753 9/1995 Leatherwood et al. ................ 235/7 R

*Primary Examiner*—Thien M. Le
*Attorney, Agent, or Firm*—Francis L. Conte

[57] ABSTRACT

A bill dispenser includes a cantilever and traction wheel attached thereto. The wheel includes a traction surface around a perimeter thereof for frictionally engaging a currency bill. Movement of the traction surface atop the bill is used for dispensing the bill from its bin.

19 Claims, 7 Drawing Sheets

CASH DRAWER BILL DISPENSER

BACKGROUND OF THE INVENTION

The present invention relates generally to cash registers, and, more specifically, to cash drawers therein.

A cash register includes a drawer having several compartments or bins in which are stored various denominations of paper currency bills and metallic coins. A typical cash drawer is in the form of a removable till containing the bins, and each of the bins for the paper bills includes a bill holder which sits atop a stack of bills therein.

Bill holders come in various configurations and typically include a cantilever or flapper which is spring loaded and positionable in an up position for allowing access to the bin for adding or removing bills, and in a down position providing a compression force atop the stack of bills to maintain them in place.

However, in order for a clerk to add or remove bills from the bins, the bill holder must be lifted up for allowing one or more bills to be inserted or removed from the bins.

Accordingly, it is desired to improve the bill holder to perform the additional function of at least dispensing individual bills without lifting the bill holder.

BRIEF SUMMARY OF THE INVENTION

A bill dispenser includes a cantilever and traction wheel attached thereto. The wheel includes a traction surface around a perimeter thereof for frictionally engaging a currency bill. Movement of the traction surface atop the bill is used for dispensing the bill from its bin.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
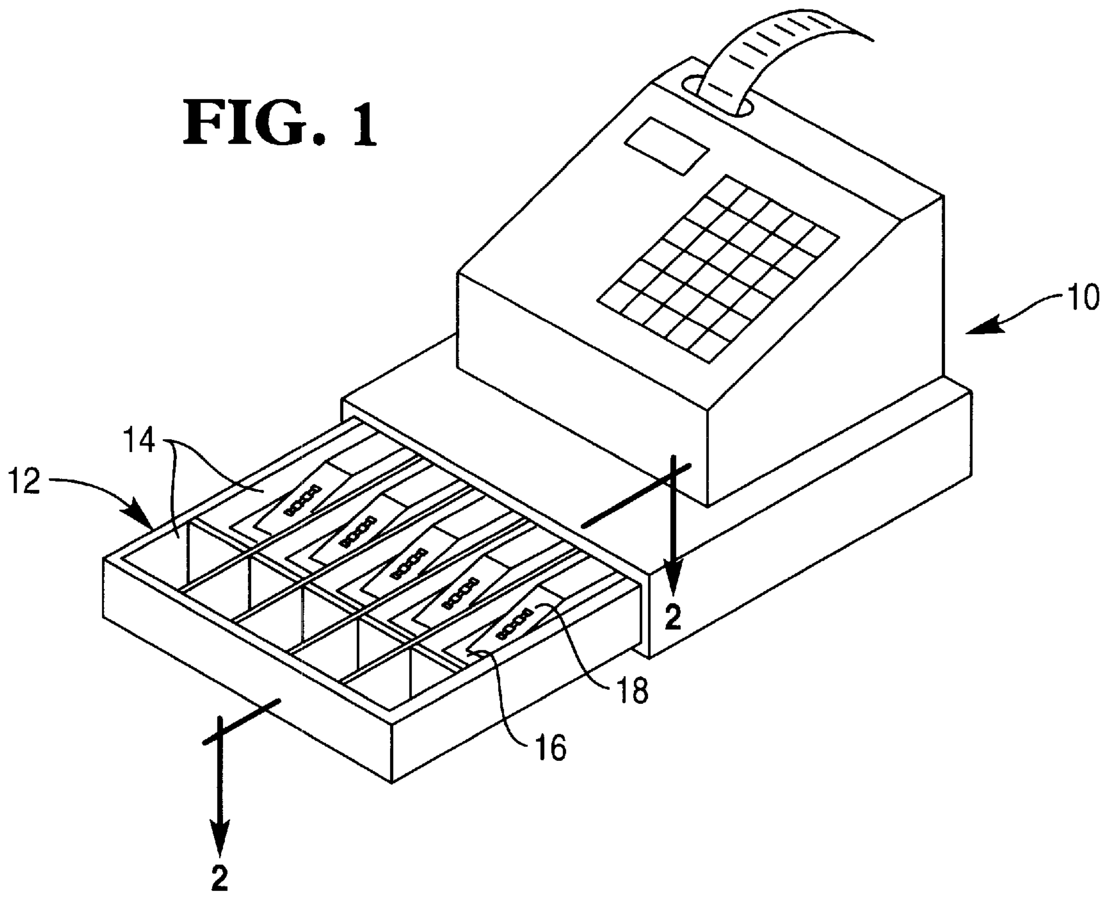
FIG. 1 is an isometric view of an exemplary cash register having a cash drawer with a bill dispenser in accordance with an exemplary embodiment of the present invention.

Illustrated in FIG. 1 is a cash register 10 which may take any conventional form for a typical Point Of Sale (POS) terminal for example. The register 10 includes a cash drawer 12 which automatically is ejected open when required by the register in a typical sales transaction to expose a plurality of currency compartments or bins 14 therein. One group of the bins 14 is arranged in a back row configured in width, length, and depth for storing flexible paper currency bills 16 in corresponding denominations. A front row of smaller bins is provided for storing metallic coins in various denominations typically aligned with respective ones of the rear bins. The cash drawer 12 is typically in the form of a removable tray or till which may be metal or plastic having integral dividers which define the several bins 14.

Figure 2:
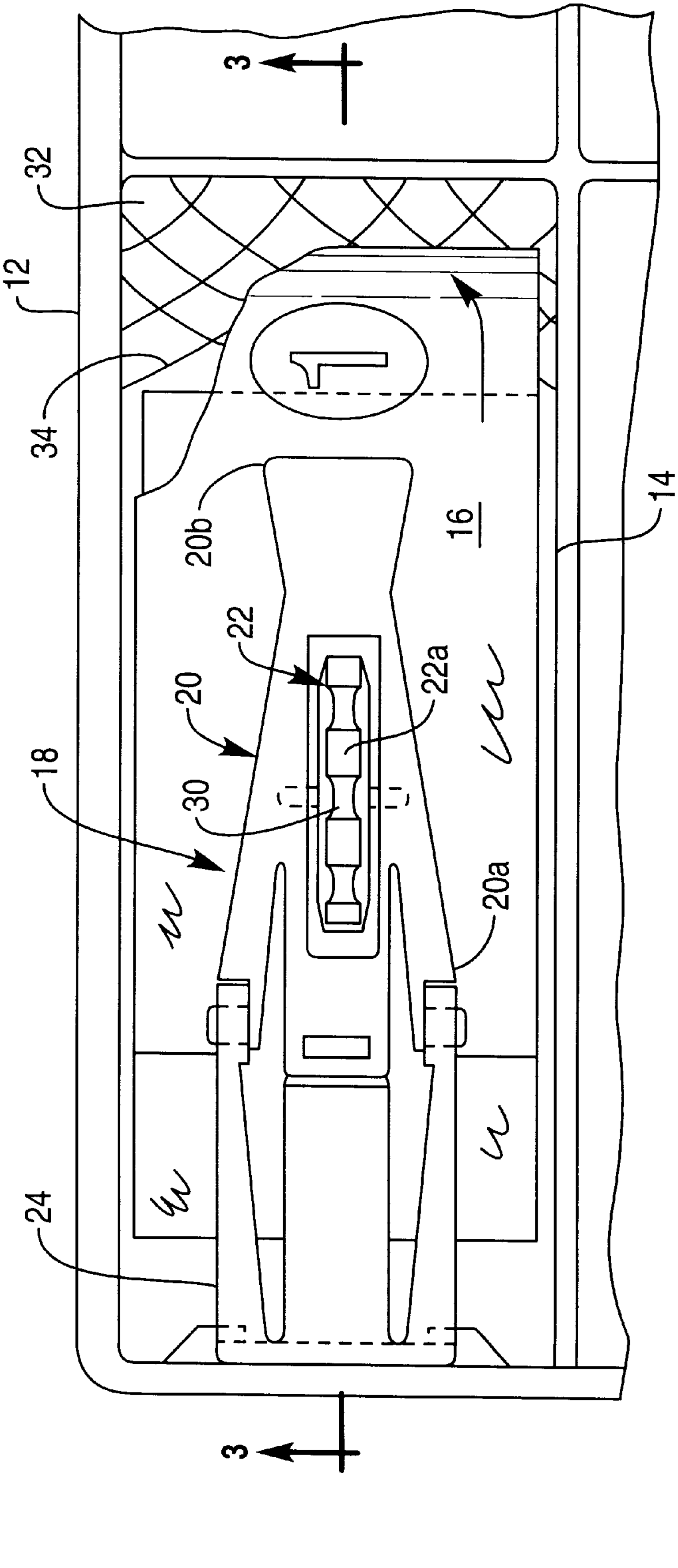
FIG. 2 is a top, plan view of one of several bill compartments in the cash drawer illustrated in FIG. 1 and taken along line 2—2 showing a bill dispenser in accordance with an exemplary embodiment of the present invention.

As shown generally in FIG. 1 and in more detail in FIG. 2, each of the bins 14 configured for storing the currency bills 16 includes a respective bill holder and dispenser 18 in accordance with an exemplary embodiment of the present invention. The dispenser 18 provides a clamping force in its down position to hold a stack of bills in the bin, and also allows improved manual dispensing of individual bills by a clerk when desired. The dispenser 18 also has an up or lifted position for replenishing the stack of bills in the corresponding bins, or removing groups of the bills if desired.

Figure 3:
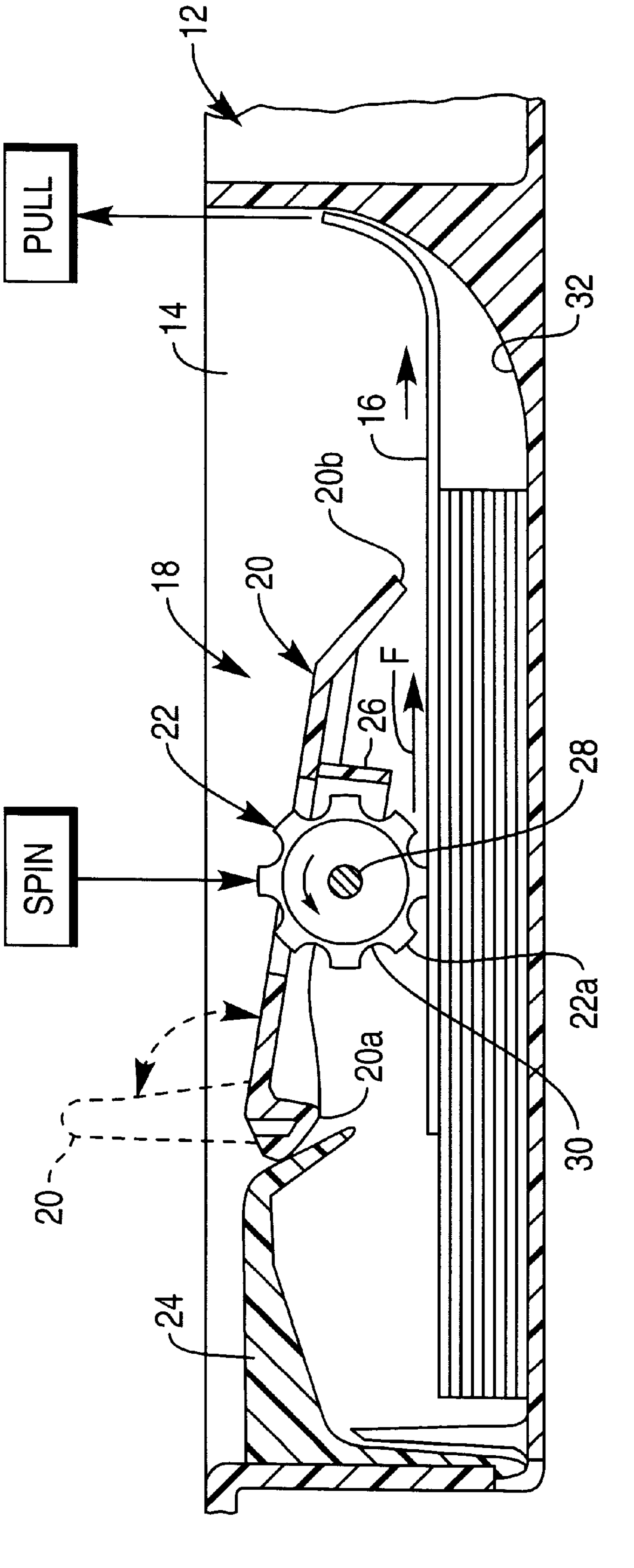
FIG. 3 is a side elevational view, partly in section of the bill dispenser in the compartment illustrated in FIG. 2 and taken along line 3—3.

The bill dispenser 18 is illustrated in more detail in FIGS. 2 and 3 and includes a frame in the form of a cantilever 20 having a base 20*a* at a proximal end which is pivotally mounted in the bin to freely suspend a tip 20*b* at an opposite distal end thereof. A traction wheel 22, which is preferably made of rubber, is pivotally attached to the cantilever adjacent the tip, and includes a traction surface 22*a* around a perimeter thereof for frictionally engaging and dispensing individual ones of the bills 16 in contact therewith.

The traction wheel 22 may be suitably incorporated in any type of conventional bill holder for converting it to the additional purpose of bill dispensing. For example, the cantilever 20, but for the incorporated traction wheel 22, is otherwise conventional and may be configured and operated in a conventional manner like that found in U.S. Pat. No. 3,892,309, assigned to the present assignee. As shown in FIGS. 2 and 3, the cantilever 20 is pivotally attached to a corresponding removable mounting bracket 24. The base of the bracket 24 is configured for being removably mounted in a corresponding slot at the back of the till 12 for assembly and replacement purposes.

The bracket 24 includes a pair of outboard arms having side apertures at distal ends thereof which receive corresponding mounting pins disposed at the base end in corresponding outboard arms of the cantilever 20 for pivotally mounting the cantilever to the bracket. The bracket 24 also includes a center portion between the outboard arms having an inclined distal end which forms a cantilever leaf spring. The base of the cantilever 20 has a corresponding center portion configured in the form a cam which engages the leaf spring on the bracket. The cantilever 20 has a down position atop the stack of bills 16 as shown in FIG. 3 maintained by spring force from the bracket leaf spring against the cam of the cantilever. The cantilever also has a raised or up position illustrated in phantom line in FIG. 3 and in solid line in FIG. 4 which extends generally perpendicularly upwardly from the bills in the bins for allowing access thereto, with the up position being maintained by the spring force on the cam at the cantilever base.

Figure 4:
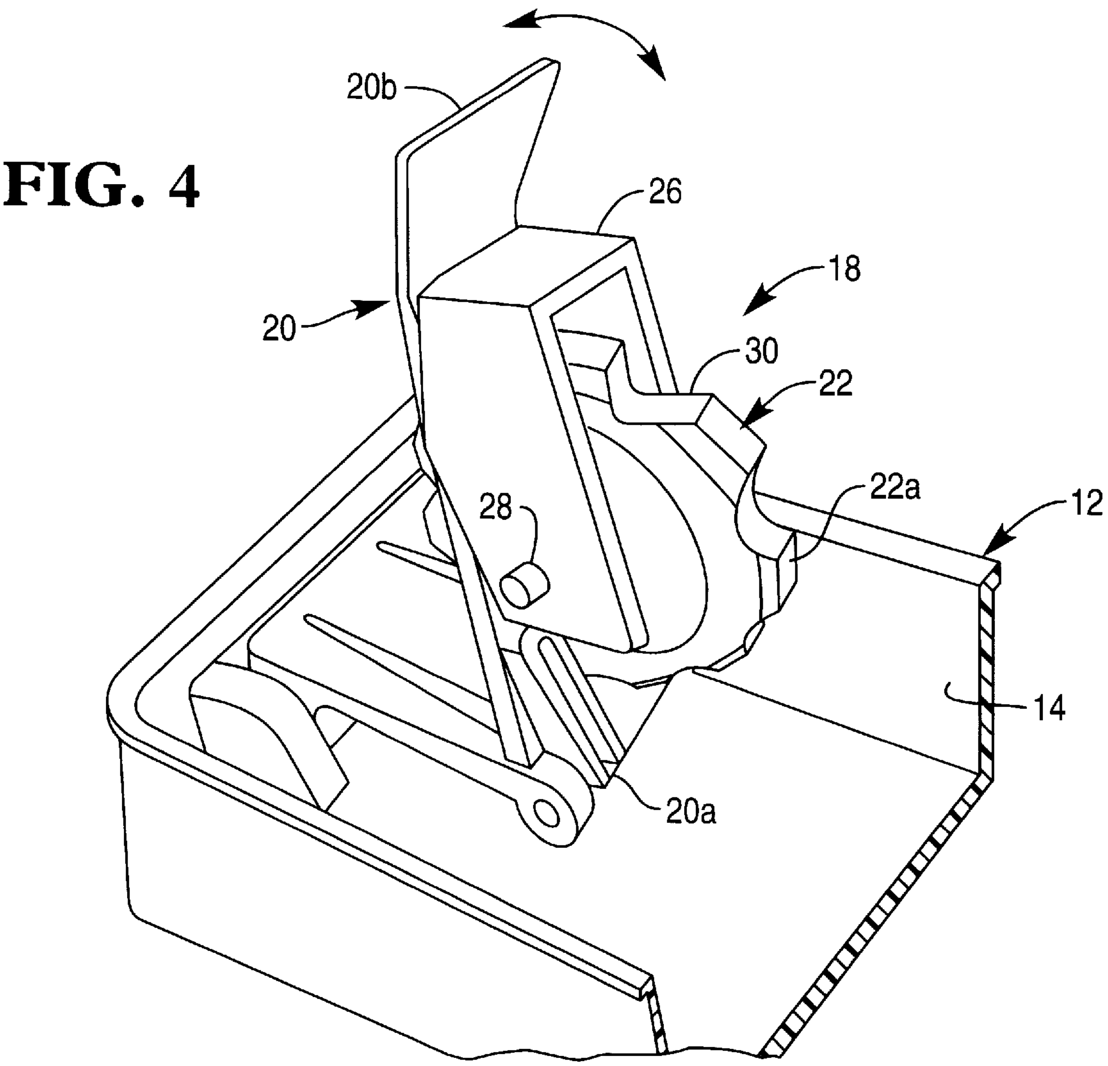
FIG. 4 is an isometric view of the bill dispenser illustrated in FIG. 2 in a lifted or raised,position for allowing access into the bill compartment.

As shown in FIGS. 3 and 4, means are provided for manually engaging the traction surface 22*a* against the top bill 16 in the bin 14 for translation thereof to the front of the bin to eject the bill at least in part therefrom. In the exemplary embodiment illustrated, the engaging means include pivotally attaching the traction wheel 22 to the cantilever for selective rotation manually by the clerk. This is effected by providing a housing or frame 26 attached to the bottom of the cantilever 20 for mounting the traction wheel 22 centrally therein using a center shaft 28. The shaft 28 allows the wheel to be manually rotated on the otherwise stationary cantilever 20 for use in dispensing individual bills in turn with the cantilever in its down position atop the bills. The traction wheel 22 provides a compressive holding force atop the stack of bills for functioning as a typical bill holder, yet when the traction wheel 22 is manually rotated, individual bills may be dispensed.

More specifically, in the exemplary embodiment illustrated in FIGS. 3 and 4, the engaging means preferably also include a plurality of circumferentially spaced apart recesses or notches 30 in the perimeter of the traction wheel which separate the traction surface 22*a* into a corresponding plurality of circumferential segments at the top of corresponding teeth. The notches 30 are sized and configured for manually rotating the wheel by finger to engage the traction surface segments in turn upon an individual bill for sequential translation thereof.

As shown in FIG. 3, by spinning the traction wheel 22 in the counterclockwise rear direction illustrated, the top bill 16 can be dispensed forwardly inside the bin 14. The spring force from the bracket 24 provides some downward force upon the traction wheel 22, and the manual spinning thereof by a clerk provides additional downward force which effects frictional engagement between individual ones of the traction surfaces 22*a* in contact with the top of the bill 16 for sliding it forwardly atop the next underlying bill in the stack.

In the preferred embodiment, the individual notches 30 are about as wide as corresponding ones of the traction surfaces 22*a* along the circumferential direction on the perimeter of the wheel for both providing sufficient space for inserting a finger in a notch 30 and improving the traction effect of the surfaces 22*a*. Each traction surface 22*a* is preferably generally flat or slightly convex and has a corresponding, generally sharp leading edge which first contacts the top of a bill as the wheel is rotated. The traction surface 22*a*, and preferably the entire wheel, is formed of a suitable traction material such as rubber for effecting a frictional dispensing force F, as illustrated in FIG. 3, as the wheel is rotated or spun for dispensing the bills. Although the notches 30 may be eliminated in an alternate embodiment, see below, having a circumferentially continuous traction surface 22*a*, in the preferred embodiment the relatively large notches 30 are preferred for maximizing the ease of use and bill dispensing capability of the traction wheel 22.

As shown in FIG. 3, the traction wheel 22 includes a bottom having a respective one of the traction surfaces 22*a* engaging the top of the bill 16, and the cantilever tip 20*b* defines a guide having a predetermined vertical gap relative to the wheel bottom and bill top for guiding the bill upon dispensing thereof. The cantilever tip 20*b* does not normally contact the top of the bills, which instead are held in place by the traction wheel 22 itself. The cantilever guide 20*b* is positioned instead to guide individual bills being dispensed to prevent excessive vertical movement or buckling thereof during the dispensing process.

Since the bill dispenser 18 is configured for specific use in combination with the till 12, the corresponding bins 14 are preferably modified to include an arcuate front ramp 32 as shown in FIG. 3 which is generally concave for turning or guiding upwardly the leading edge of the bills as they are being dispensed. As the traction wheel 22 is rotated to dispense an individual bill forwardly in the bin 14, the leading edge of the bill engages the ramp 32 and is guided upwardly so that it is conveniently positioned for being manually grabbed and removed the clerk.

Furthermore, the front ramp 32 as shown in FIG. 2 is preferably knurled or rough in texture using exemplary crossing score lines 34 to frictionally restrain underlying bills as a top bill is being dispensed. In the event the traction wheel 22 dispenses more than the top bill due to excessive friction between the top bill and underlying bills, the underlying bills will engage the scores 34 on the ramp 32 and meet additional frictional resistance for improving the dispensing of only the single top bill from the bin.

The introduction of the traction wheel 22 into the cantilever 20 is a relatively simple modification which maintains the bill holding capability of the cantilever by the traction wheel 22 itself, yet also provides the additional function of manual bill dispensing by simple rotation of the traction wheel when desired. The bill dispenser 18 is simply operated by lowering the cantilever 20 to position the traction wheel 22 atop the stack of bills, and then manually rotating and pressing downwardly the traction wheel in a rearward direction from the top thereof to partially dispense the top bill forwardly. The wheel 22 is rotated as much as necessary to move the bill forwardly in the bin and up the ramp 32 until it is in position for being manually removed by the clerk.

An additional advantage of operating the bill dispenser 18 is that the partially dispensed bill may then be manually pulled by the clerk which in turn automatically and additionally rotates the traction wheel 22 by friction from the pulled bill, which autofeeds the next lower bill directly beneath the bill being dispensed. As the top bill is yanked from the bin 14, the weight of the traction wheel 22 itself sitting atop the bill maintains sufficient frictional engagement force therewith which causes the wheel to rotate further by pulling of the bill thereunder. Inertia of the traction wheel 22 causes additional rotation thereof which partially ejects the underlying bill. The traction wheel may then be additionally turned if desired for further dispensing that bill, or that bill may be manually grabbed and pulled by the clerk autofeeding yet another underlying bill.

In a preferred embodiment, the traction wheel 22 is freely rotatable in opposite directions on its shaft 28 so that a clerk may rotate the wheel in forward or clockwise direction, see FIG. 3, to reinsert any partially dispensed bill if desired, or to resupply the bin with bills individually without lifting the cantilever 20.

The relatively simple traction wheel 22 may be readily incorporated into various forms of bill holders for use therewith. It therefore minimizes the required changes in the bill holder and has relatively low cost. And, most significantly, it provides the ability to dispense individual bills from the bins in a simple manner without lifting the bill dispenser itself.

Figure 5:
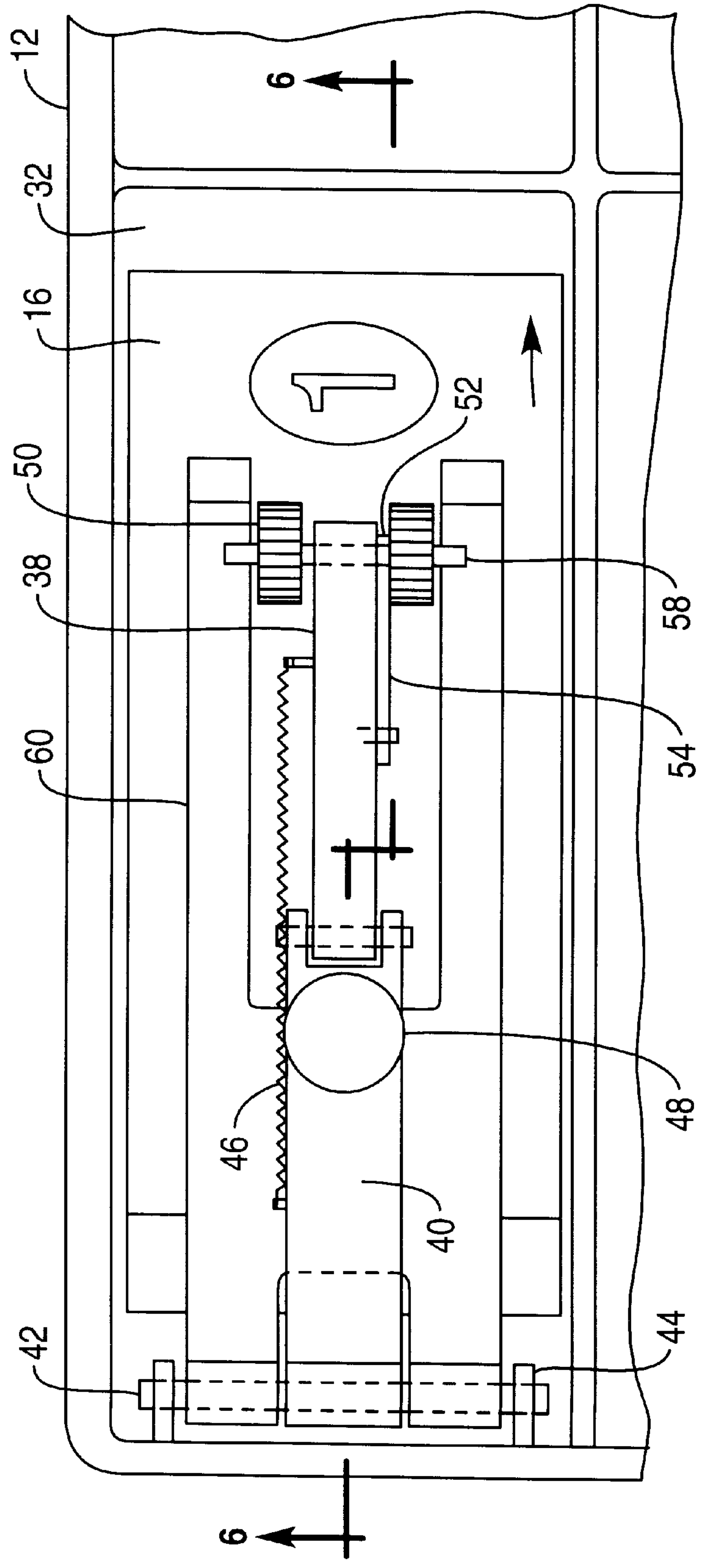
FIG. 5 is a top, plan view of a bill compartment including a bill dispenser in accordance with an alternate embodiment of the present invention.
Figure 6:
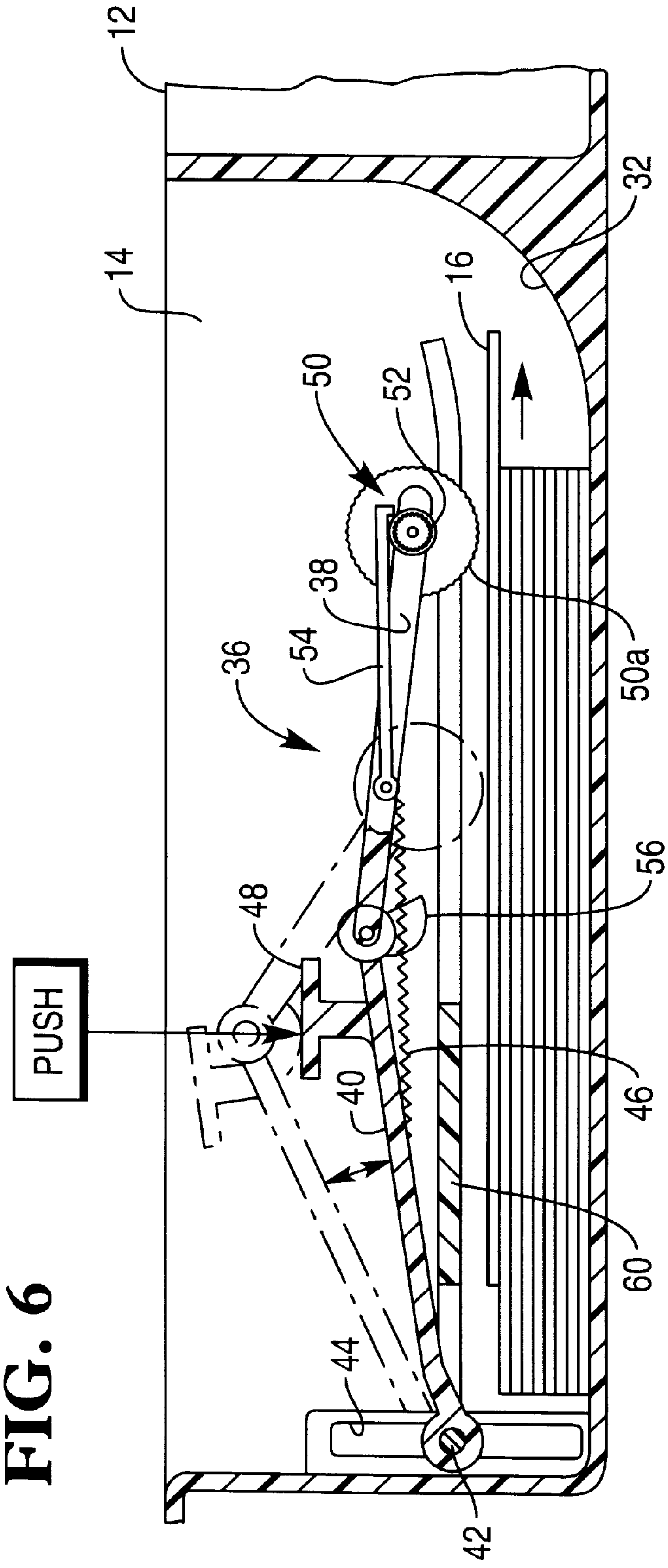
FIG. 6 is a side elevation view, partly in section of the bill dispenser illustrated in FIG. 5 and taken along line 6—6.
Figure 7:
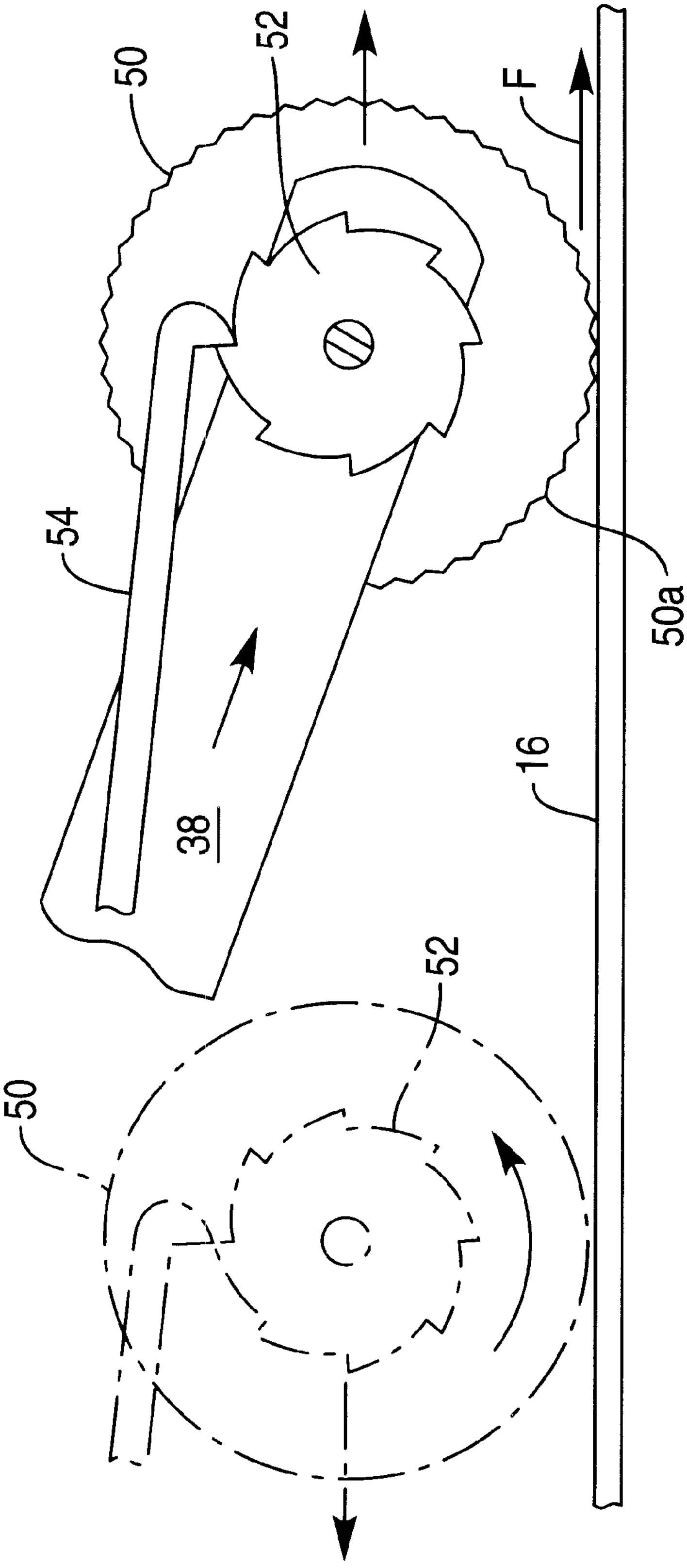
FIG. 7 is an enlarged view of an exemplary traction wheel of the bill dispenser illustrated in FIGS. 5 and 6.

Another form of the bill dispenser, designated 36, is illustrated in FIGS. 5–7. In this embodiment, the cantilever, designated 38, is pivotally attached at its proximal, base end to a corresponding tip end of a base lever 40 defining a second cantilever having a root end pivotally mounted by a shaft 42 extending through a pair of vertical slots 44 in the till. The shaft 42 and slots 44 allow the articulated cantilever 38 and base lever 40 to be pivoted together upwardly for allowing unobstructed access into the corresponding bin 14 while allowing the assembly to be lowered atop the stack of bills 16 irrespective of the height of the bill stack.

A tension coil spring 46 extends between the base lever and cantilever and is attached thereto at opposite ends thereof. The cantilever and base lever are joined together in a generally inverted V-shape with an obtuse joining angle therebetween, and the spring 46 provides retraction force to pull the distal end of the cantilever 38 toward the root end of the base lever 40 for minimizing that obtuse angle.

A push button or pad 48 is provided or defined atop one of the levers 38,40 near the intersection point thereof for manually depressing downwardly both levers against the retraction force from the spring to translate the traction wheel, designated 50, atop the bill 16 for dispensing thereof.

In the first embodiment disclosed above, the traction wheel 22 is freely rotatable, and is manually rotated for dispensing an individual bill. In the alternate embodiment illustrated in FIGS. 5–7, the traction wheel 50 has a different, clutch wheel form and preferably does not rotate during the dispensing operation, with its perimeter traction surface 50*a* instead engaging the bill 16 using the articulated cantilever 38 and base lever 40 in a pumping manner.

More specifically, the means for manually engaging the traction surface 50*a* against the bill for translation thereof further include a ratchet in the form of a wheel 52 suitably attached to the traction wheel 50, and a corresponding pawl 54 pivotally attached to the cantilever 38 and operatively engaging the ratchet 52. The ratchet 52 and pawl 54 prevent forward, clockwise rotation of the traction wheel 50 upon depression of a push pad 48, and permit only one way, reverse, counterclockwise rotation of the traction wheel upon release of the pad 48.

The ratchet and pawl allow unrestrained reverse rotation of the traction wheel 50 as the cantilever 38 is retracted atop the stack of bills. In this way, reverse frictional force is not created which would return the dispensed bill to its original position atop the stack. The free reverse movement of the traction wheel 50 also allows individual bills to be yanked by the clerk and removed from below the traction wheel without resistance therefrom.

The bill dispenser 36 illustrated in FIGS. 5–7 is operated by initially lowering the levers 38,40 into the bin 14 for placing the traction wheel 50 atop the stack of bills 16. Then by manually pushing or depressing the push pad 48 downwardly, the cantilever 38 and base lever 40 are extended in collective length against the retraction force from the spring 46 which translates forwardly the traction wheel 50 for frictionally engaging and dispensing at least in part the top bill 16. Since this downward pumping action of the two levers 38,40 translates the traction wheel 50 toward the front of the bin 14, the ratchet and pawl prevent forward rotation of the wheel for effecting frictional engagement of the wheel with the bill 16 for dispensing thereof.

Upon removing the depression force from the push pad 48, the retraction spring 46 is allowed to retract the cantilever 38 against the base lever 40 by pivoting around the intermediate joint therebetween. In the preferred embodiment illustrated in FIG. 6, an integral tab 56 is attached to the distal end of the base lever 40 and is configured in arcuate extent to provide an abutment stop to limit the retraction of the cantilever 38 against the base lever 40 while allowing unobstructed extension of the cantilever 38 therefrom.

In a preferred embodiment, the traction wheel 50 is circumferentially continuous and the traction surface 50*a* thereof has suitable frictional performance and may be formed of rubber for example. The traction surface 50*a* may have small ribs for maximizing frictional engagement with the bills during dispensing.

In the exemplary embodiment illustrated in FIG. 5, for example, a pair of the traction wheels 50 are fixedly attached to a common through-shaft 58 and straddle the distal end of the cantilever 38. The ratchet 52 may be attached to the side of one of the traction wheels and the pawl 54 may be pivotally attached to an intermediate portion of the cantilever 38 for engaging the ratchet 52.

In the preferred embodiment illustrated in FIGS. 5 and 6, the bill dispenser also includes a cooperating fork 60 pivotally mounted at its base end to the bin, preferably at the root end of the base lever using the common shaft 42. The fork includes a pair of spaced apart fork arms which support the traction wheels 50 when lifted by extending the opposite ends of the shaft 58 to rest thereatop as illustrated in FIG. 5. As shown in FIG. 6, the bottom of the traction wheels 50 extend below the fork 60 for engaging the stack of bills therebelow. In this way, the cantilever 38 may be lifted alone, or by lifting the fork 60, and may be pumped for bill dispensing without obstruction from the fork.

The distal ends of the arms of the fork 60 as illustrated in FIG. 6 preferably define a predetermined vertical gap relative the bottom of the traction wheels 50 and the top bill for guiding the bill upon dispensing in a manner similar to the cantilever tip 20*b* described above in the first embodiment. Similarly, the bin 14 may also include the arcuate ramp 32 which cooperates with the bill being dispensed for guiding it upwardly for being grabbed by the clerk.

The first embodiment of the bill dispenser 18 illustrated in FIGS. 2–4 provides simplicity and ease of use by simply manually spinning the notched traction wheel 22 for dispensing individual bills. The second embodiment of the bill dispenser 36 illustrated in FIGS. 5–7 includes additional components which engage the ratcheted traction wheels 50 with the bills by a simple pumping action downwardly using the push pad 48. Its additional complexity and attendant cost may be offset by the ease of its use in view of the substantial number of bill dispensing repetitions required in a typical work shift.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A dispenser for a currency bill stored in a bin in a cash register comprising:

a cantilever having a base at one end for being pivotally mounted in said bin to suspend a tip at an opposite end thereof; and a traction wheel attached to said cantilever adjacent said tip, and including a traction surface around a perimeter thereof for frictionally dispensing said bill.

2. A dispenser according to claim 1 further comprising means for manually engaging said traction surface against said bill for translation thereof to eject said bill in part from said bin.

3. A dispenser according to claim 2 wherein said engaging means comprise said traction wheel being pivotally attached to said cantilever for selective rotation.

4. A dispenser according to claim 3 wherein said engaging means further comprise a plurality of circumferentially spaced apart notches in said wheel perimeter separating said traction surface into circumferential segments, with said notches being configured for manually rotating said wheel to engage said traction segments in turn upon said bill for sequential translation thereof.

5. A dispenser according to claim 4 wherein said notches are about as wide as corresponding ones of said traction surfaces.

6. A dispenser according to claim 4 wherein said traction wheel includes a bottom having a respective one of said traction surfaces for engaging a top of said bill, and said cantilever tip defines a gap relative to said wheel bottom and bill top for guiding said bill upon dispensing thereof.

7. A dispenser according to claim 4 wherein said traction wheel is free rotatable in opposite directions.

8. A dispenser according to claim 4 in combination with said till including stack of said bills in said bin, and said bin includes an arcuate front ramp for guiding said dispensed bill upwardly from said bin.

9. An apparatus according to claim 8 wherein said ramp is knurled to frictionally restrain bills underlying said dispensed bill.

10. A method of operating said bill dispenser according to claim 4 comprising:

lowering said cantilever to position said traction wheel atop said bill; and manually rotating rearwardly and pressing downwardly said traction wheel from atop thereof to partially dispense said bill forwardly.

11. A method according to claim 10 further comprising manually pulling said partially dispensed bill to rotate said wheel by friction therefrom and autofeed a lower bill directly beneath said dispensed bill.

12. A dispenser according to claim 3 wherein said engaging means further comprise:

a base lever having a root for being pivotally mounted in said bin, and an opposite tip pivotally attached to said cantilever base at an obtuse angle;

a spring extending between said base lever and cantilever to retract said cantilever toward said base lever; and a push pad attached to one of said levers for manually depressing downwardly said levers against force from said spring to translate said traction wheel atop said bill for dispensing thereof.

13. A dispenser according to claim 12 wherein said engaging means further comprise a ratchet attached to said traction wheel, and a pawl attached to said cantilever and engaging said ratchet.

14. A dispenser according to claim 13 wherein said ratchet and pawl are configured to prevent rotation of said traction wheel in a forward direction upon depression of said pad, and permit rotation of said traction wheel in a reverse direction to roll freely atop said bill.

15. A dispenser according to claim 14 further comprising a fork pivotally mounted at a base end to said bin at said base lever root, and supporting said traction wheel 50 between spaced apart arms thereof.

16. A dispenser according to claim 15 wherein:

said traction wheel 50 includes a bottom wherein a portion of said traction surface engages a top of said bill; and said fork arms have distal ends defining a gap relative to said wheel bottom and bill top for guiding said bill upon dispensing thereof.

17. A dispenser according to claim 14 in combination with said till including a stack of said bills in said bin, and said bin includes an arcuate front ramp for guiding said dispensed bill upwardly from said bin.

18. A method of operating said dispenser of claim 14 comprising:

lowering together said cantilever and base lever to position said traction wheel atop said bill; and depressing said push pad downwardly to extend said base lever and cantilever against retraction force from said spring, and for translating forwardly said traction wheel to frictionally engage and dispense said bill.

19. A method according to claim 18 further comprising removing depression force from said push pad and allowing said spring to retract said cantilever against said base lever.

* * * * *

UNITED STATES PATENT AND TRADEMARK OFFICE
CERTIFICATE OF CORRECTION

PATENT NO. : 6,152,366
DATED : November 28, 2000
INVENTOR(S) : Craig E. Maddox et al.

It is certified that error appears in the above-identified patent and that said Letters Patent is hereby corrected as shown below:

<u>Column 6,</u>
Line 48, after "register" insert -- till --.

<u>Column 7,</u>
Line 12, delete "free" and substitute -- freely --.
Line 14, after "including" insert -- a --.

Signed and Sealed this

Sixteenth Day of April, 2002

*Attest:*

JAMES E. ROGAN

*Attesting Officer*

*Director of the United States Patent and Trademark Office*